Nov. 24, 1964

F. G. CROASDAILE 3,158,150

INCUBATORS FOR PREMATURE INFANTS

Filed Nov. 20, 1962

INVENTOR
FREDERICK GEORGE CROASDAILE
BY
Greene and Durr
ATTORNEY

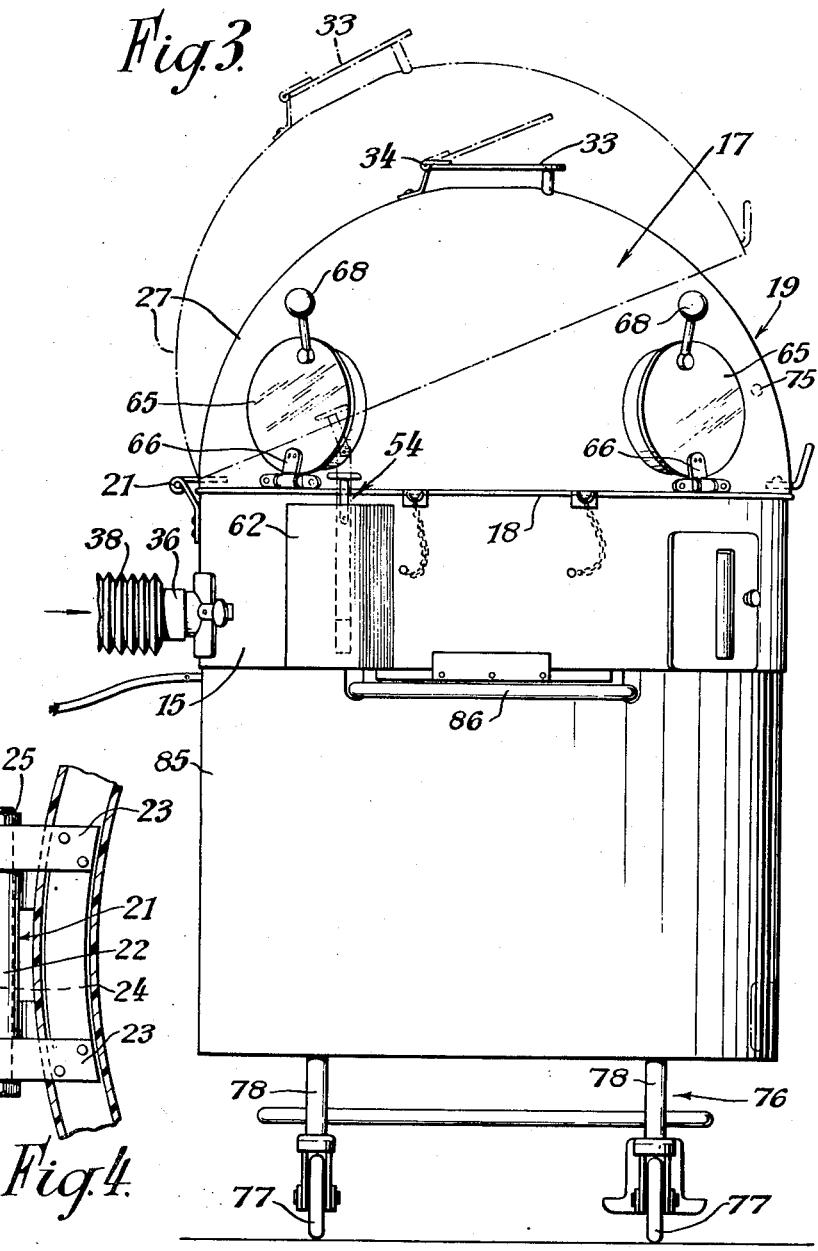

Nov. 24, 1964 F. G. CROASDAILE 3,158,150
INCUBATORS FOR PREMATURE INFANTS
Filed Nov. 20, 1962 5 Sheets-Sheet 3

INVENTOR
FREDERICK GEORGE CROASDAILE
BY
ATTORNEY

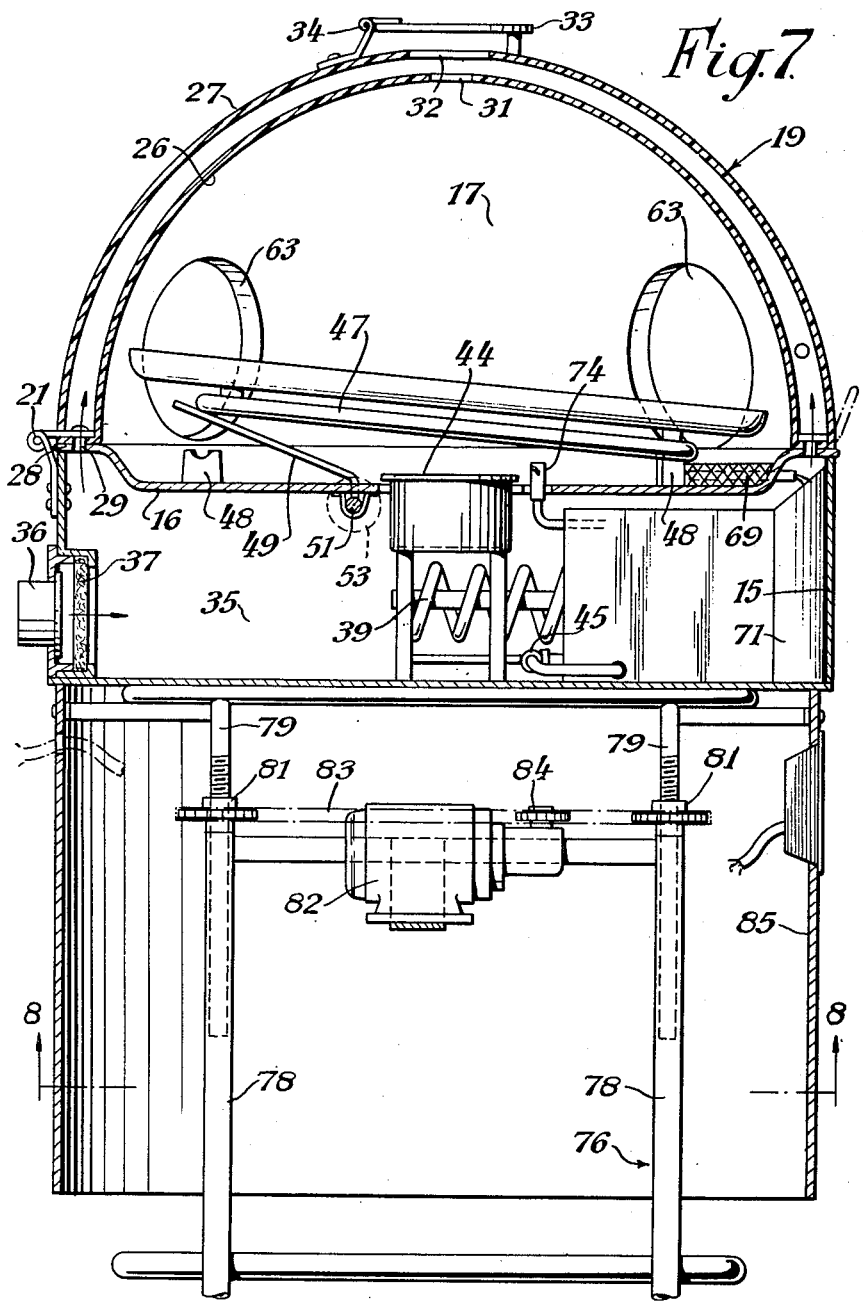

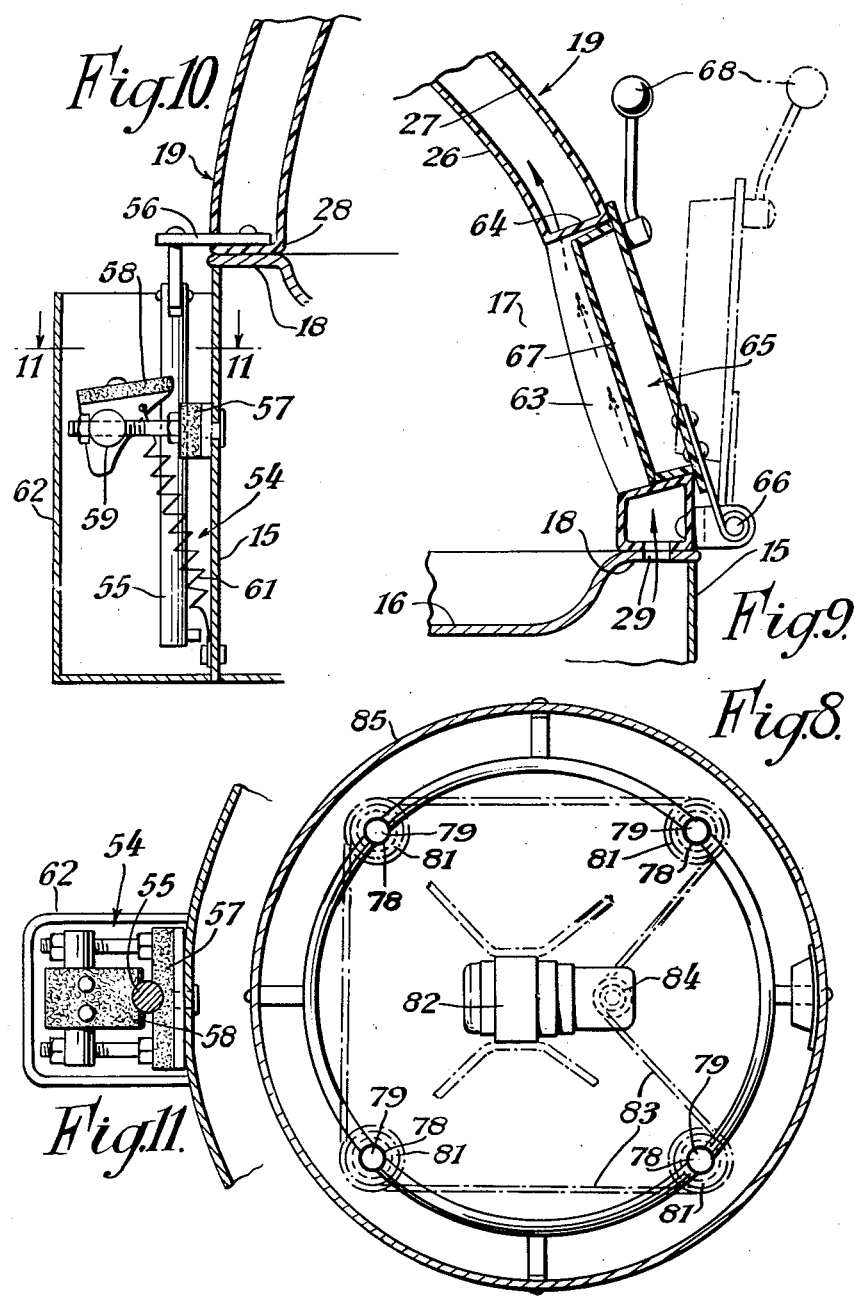

United States Patent Office 3,158,150
Patented Nov. 24, 1964

3,158,150
INCUBATORS FOR PREMATURE INFANTS
Frederick George Croasdaile, London, England, assignor to Oxygenaire (London) Limited, London, England
Filed Nov. 20, 1962, Ser. No. 238,890
Claims priority, application Great Britain, Nov. 23, 1961, 42,000/61
11 Claims. (Cl. 128—1)

This invention relates to incubators for premature infants.

Incubators for this purpose usually comprise an infant-receiving chamber having a cover which is wholly transparent or transparent over the greater portion of its area and means for maintaining in the infant-receiving chamber an atmosphere controlled as to temperature and humidity.

The object of the present invention is to provide an improved incubator for this purpose.

According to the present invention an incubator for premature infants comprises an infant-receiving chamber and means for controlling the temperature and humidity of air in the said chamber, wherein the infant-receiving chamber is defined by a base wall separating it from an air intake chamber and by a domed cover consisting of two spaced walls, and heating means are provided in the air intake chamber to heat air admitted thereto, part of the heated air being supplied to the infant-receiving chamber and the remainder to the space between the walls of the domed cover, and air from both the infant-receiving chamber and the said space escaping through an opening in the top of the domed cover.

Means may be provided in the air intake chamber to increase the humidity of a part of the air supplied to the infant-receiving chamber.

Means may also be provided to vary the humidity of the air supplied to the infant-receiving chamber.

The air intake chamber may be mounted on a stand or trolley for vertical movement relative thereto, to enable the position of the infant-receiving chamber to be vertically adjusted.

A tray to support an infant in the infant-receiving chamber may be mounted for rotary movement in the said chamber and means may be provided for lifting one side of the tray to tilt it about a horizontal axis.

Both walls of the domed cover are preferably formed of transparent material.

The invention is hereinafter described with reference to the accompanying drawings, in which:

FIGURE 3 is a side elevation;

FIGURE 4 is an enlarged detail plan view showing the hinge mounting of the domed cover of the incubator;

FIGURE 7 is an enlarged sectional elevation showing the elevating mechanism;

FIGURE 8 is an inverted plan view on the line 8—8 of FIGURE 7;

FIGURE 9 is a section through one of the ports in the cover;

FIGURE 10 is a section through friction damping means associated with the cover; and FIGURE 11 is a sectional plan on the line 11—11 of FIGURE 10.

Figure 1:
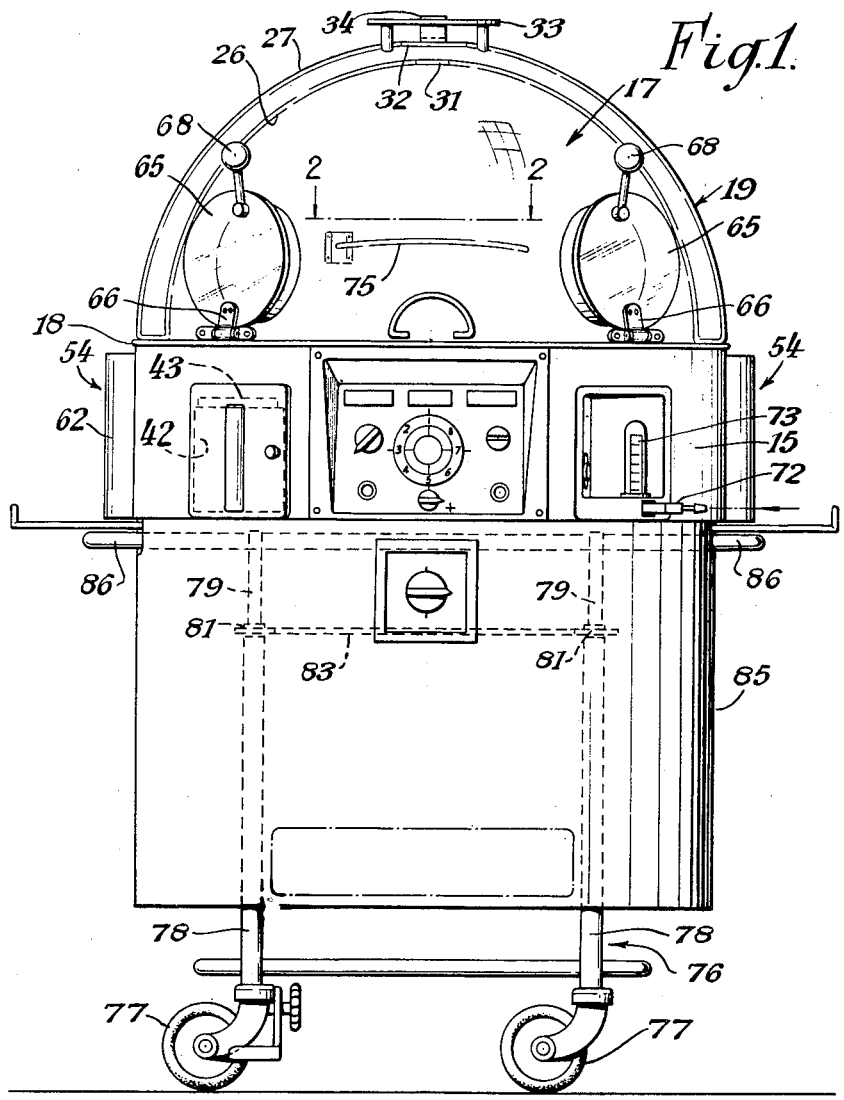
FIGURE 1 is a front elevation of one form of incubator according to the invention.

Referring to the drawings, the incubator comprises a substantially cylindrical casing 15 of short axial length and having its axis vertical, the top wall 16 of the casing, which also forms the base wall of an infant-receiving chamber 17, being somewhat dished so that a raised rim 18 is formed around its edge as shown in FIGURE 7. On this rim 18 rests the lower edge of a double walled domed cover 19 both walls of which are formed of transparent substantially rigid material such as "Perspex," the cover 19 being hinged to the casing 15 at 21 by a detachable hinge which as shown in FIGURE 4 comprises a hinge barrel 22 formed on a bracket fixed to the casing, a pair of straps 23 fixed to the cover and having their ends rolled to tubular form, and a removable hinge pin 24 passing through the barrel 22 and the rolled ends of the straps 23, and secured by a nut 25 engaging its screw-threaded end. The inner and outer walls 26 and 27 of the domed cover are connected at their lower edges by a ring 28, the ring 28 and the rim 18 being formed with mating slots to enable air to pass from the interior of the casing into the space between the walls 26 and 27. The slots in the rim 18 are shown at 29 in FIGURE 6.

The inner and outer walls 26 and 27 of the cover both have holes therein at their highest points, the hole 31 in the inner wall 26, as shown in FIGURE 7, being smaller than the hole 32 in the outer wall 27. A baffle plate 33, hingedly mounted at 34, covers the holes 31, 32 to prevent the ingress of foreign matter, the baffle plate 33 being spaced from the outer wall 27 so that air can escape freely.

The interior of the casing 15 forms an air intake chamber 35, air being admitted thereto through an inlet at 36 in which is mounted a filter pad 37. Air may be drawn directly from the ambient atmosphere or through a flexible pipe such as is shown at 38 in FIGURES 3 and 5, from a remote point, such as the outside of the window of a room in which the incubator is housed. An electric heater 39 (FIGURE 7) is provided to warm the air in the chamber 35 so that it rises by convection, some of it passing through a central aperture 41 in the top wall 16 into the infant-receiving chamber, and the rest passing through the slots 29 into the space between the dome walls 26 and 27. The air finally passes through the holes 31 and 32 to the atmosphere.

A humid atmosphere is usually required in infant-receiving incubators, and, to produce sufficient humidity, water vapour is added to the air entering the infant-receiving chamber 17. The water is conveyed by suitable means from a bottle 42, housed in a compartment 43 in the chamber 35 so that it is partially visible from the exterior and the level of water therein can be readily seen, to an evaporator 44 mounted in the aperture 41 above the heater 39, a tap being provided at 45 to control the flow of water to the evaporator.

Thus a continuous flow of heated air is provided through the infant-receiving chamber 17 and through the space between the cover walls 26 and 27, but only the air passing through the chamber 17 is humidified. The chamber 17 is completely surrounded by enclosed spaces (the air intake chamber 35 and the space between the cover walls 26 and 27) containing warm air, and no wall thereof is directly exposed to the ambient atmosphere. Consequently, an infant in the receiving chamber 17, even if it rolls against the wall of the chamber, does not lose heat by conduction, and its body temperature can be properly maintained at the desired level.

Moreover, because of the air between the inner and outer cover walls 26 and 27 is heated but not humidified, condensation due to contact of a hot humid atmosphere with one surface of a wall exposed on its other side to a considerably lower temperature is avoided, and the deposit of moisture on the cover, with consequent obscuring of vision, is avoided.

Figure 5:
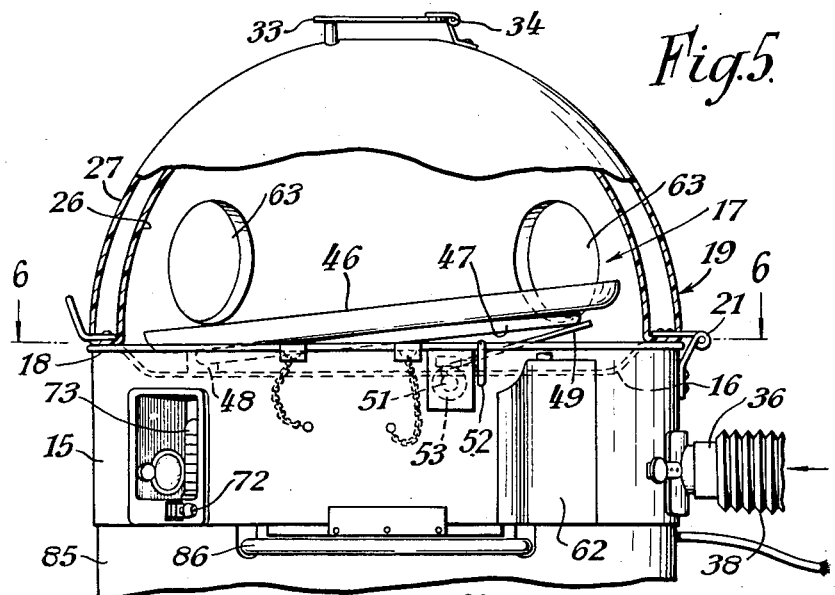
FIGURE 5 is a side elevation similar to the upper part of FIGURE 3, with part of the cover broken away.
Figure 6:
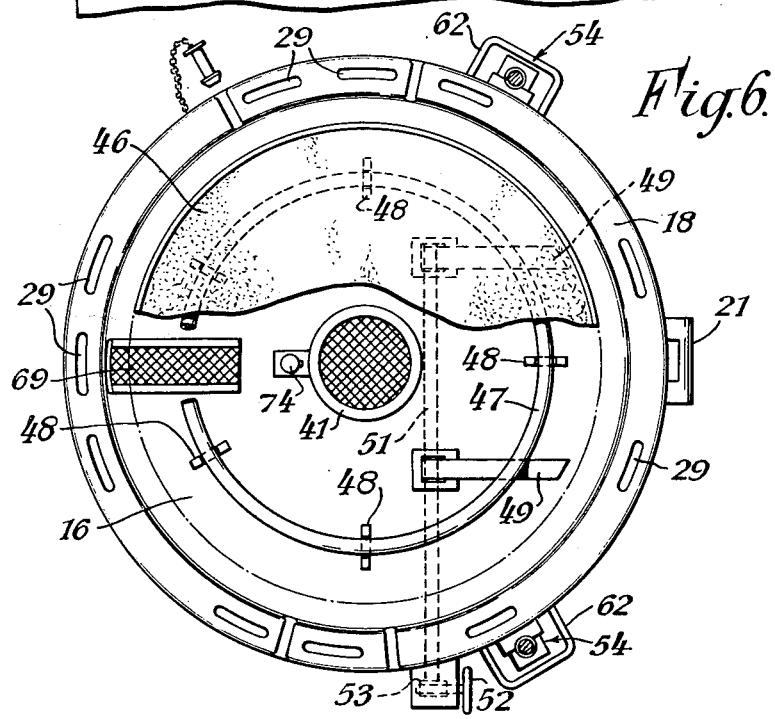
FIGURE 6 is a plan view with the cover removed and part of the tray broken away.

A tray 46 is provided to support an infant in the infant-receiving chamber 17, the tray having fixed to its underside a tubular metal ring 47 which rests in notched guides 48 mounted on the wall 16. The ring 47 and guides 48 are shown in FIGURES 6 and 7, and it will be apparent that the tray can be readily rotated on the guides. The tray can be tilted by means of a pair of arms 49, fixed to a spindle 51 (FIGURES 5, 6 and 7) and engaging the underside of the ring 47, the spindle 51 being rotatable to move the arms 49 and lift one side of the tray 46 by rotation of the handwheel 52 driving the spindle 51 through worm gearing 53 (FIGURE 5).

It will be apparent that the tray 46 covers the central aperture 41 in the wall 16, being spaced therefrom so that air rising through the aperture flows around the edges of the tray.

The cover 19, when lifted, is partially supported by a pair of friction damping devices 54, one of which is shown in detail in FIGURES 10 and 11. Each of the said devices comprises a rod 55, pivotally attached to an arm 56 projecting outwardly from the cover, the rod passing downwardly between a friction pad 57 fixed to the casing 15 and a second friction pad 58 mounted on a pivoted arm 59 urged downwardly by a tension spring 61 to grip the rod 55 between the two friction pads and apply frictional resistance to its downward movement. Each friction damping device 54 is housed in a shroud 62.

Ports 63 are provided in the domed cover 19, to provide access to the infant-receiving chamber 17 without lifting the cover 19. The gap between the inner and outer cover walls 26 and 27 around each port 63 is closed by a ring 64 extending between the two walls, so that the space between the walls is closed off from the ports as shown in FIGURE 9. Each port 63 is provided with a movable closure 65 pivoted on the cover at 66 on an axis substantially tangential to the periphery of the closure, each closure having a spigot portion 67 which enters the port 63, and a handle 68 by which it can be manipulated.

A thermostat 69 (FIGURE 7) in the base of the infant-receiving chamber controls switch means in a control unit 71 to control the supply of current to the heater 39 and thereby control the temperature in the said chamber.

Oxygen may be supplied to the infant-receiving chamber through a connection 72 (FIGURE 1) a flow gauge 73 being provided to indicate the rate at which oxygen is being supplied. The oxygen enters the infant-receiving chamber 17 through a head 74 (FIGURE 7) on a conduit leading from the flow gauge 73.

Figure 2:
FIGURE 2 is a sectional plan view, on an enlarged scale, taken on the line 2—2 of FIGURE 1.

A thermometer 75 to indicate the temperature in the infant-receiving chamber 17 may be mounted as shown in FIGURE 2, with its tube in the space between the inner and outer walls 26 and 27 of the cover, its bulb end being cranked and protruding through an opening in the inner wall 26 into the chamber 17.

The casing 15 is mounted for vertical movement relative to a trolley 76 formed of metal tubing and supported on castors 77. The trolley 76 includes four vertical tubes 78 into each of which extends downwardly a screw-threaded rod 79 fixed to the bottom of the casing 15. Nuts 81, as shown in FIGURE 7, engage the rods 79 and rest on the upper ends of the tubes 78 to support the casing 15, so that, by rotating the said nuts, the casing and the infant-receiving chamber can be raised and lowered. As shown in FIGURES 7 and 8 the nuts are coupled together and to a driving electric motor 82 by a sprocket chain 83 engaging sprocket teeth on the nuts and a driving sprocket 84 on a shaft driven through reduction gearing by the electric motor.

A skirt 85 depending from the underside of the casing 15 encloses the elevating mechanism just described, and handles 86 protruding from the sides of the skirt below the casing 15 facilitate movement of the incubator.

It will be apparent that modifications may be made in the incubator described. For example, the intake of air may be assisted by a fan or air pump to provide a more rapid circulation than is provided by thermosyphon action, and the incubator may be mounted on a stand having on wheels or castors.

I claim:

1. An incubator for premature infants comprising
an infant receiving chamber, an air intake chamber and a domed cover for the infant receiving chamber,
said infant receiving chamber being defined by a base wall separating it from said air intake chamber,
heating means in said air intake chamber for heating air admitted thereto,
said domed cover comprising two spaced walls, each of which have an opening adjacent the top portion thereof,
means for feeding a first portion of the heated air from the air intake chamber to the space between the domed walls, means for feeding a second portion of the heated air from the air intake chamber into the infant receiving chamber,
whereby said first and second portions of heated air escape through the openings in the domed cover.

2. An incubator as claimed in claim 1, comprising stand means to support the air intake chamber and infant receiving chamber in a position spaced from the floor,
said stand means comprising a plurality of vertically adjustable supports to enable the position of the infant-receiving chamber to be vertically adjusted.

3. An incubator as defined in claim 1, said infant receiving chamber comprising casing means surrounding the same, hinge means connecting said domed cover to said casing and clamping means to control the rate of movement of said domed cover in a downward direction to closed position after being lifted.

4. An incubator according to claim 1, comprising means in the air intake chamber to increase the humidity of said first portion of the air supplied to the infant-receiving chamber.

5. An incubator according to claim 4, comprising control means in said air intake chamber to vary the humidity of the air supplied to the infant-receiving chamber.

6. An incubator according to claim 1, comprising a tray to support an infant in the infant-receiving chamber and means for mounting said tray for rotary movemnt in the said chamber.

7. An incubator according to claim 6, comprising means for lifting one side of the tray to tilt it about a horizontal axis.

8. An incubator according to claim 1, wherein both walls of the domed cover are formed of transparent material.

9. An incubator according to claim 1, comprising at least two registering ports in the two walls of the domed cover to enable the hands and arms of a person to be inserted, and ring members closing the space between said walls around the ports.

10. An incubator according to claim 9, comprising movable closures to close the ports when the are not in use.

11. An incubator according to claim 10, wherein the closures are hinged on axes tangential to their peripheries, and move outwardly to open the ports.

References Cited in the file of this patent

UNITED STATES PATENTS

| | | |
|---|---|---|
| 1,933,733 | Hess | Nov. 7, 1933 |
| 2,244,082 | Reyniers | June 3, 1941 |
| 2,543,426 | Terhaar | Feb. 27, 1951 |
| 3,070,086 | Smith | Dec. 25, 1962 |